(12) United States Patent
Wu et al.

(10) Patent No.: US 8,126,393 B2
(45) Date of Patent: Feb. 28, 2012

(54) GAIN ADJUSTMENT APPARATUS, METHOD, AND TANGIBLE MACHINE-READABLE MEDIUM THEREOF FOR A MULTIPLE INPUT MULTIPLE OUTPUT WIRELESS COMMUNICATION SYSTEM

(75) Inventors: Chun-Jung Wu, Tainan (TW); David W. Lin, Hsinchu (TW); Youn-Tai Lee, Yung-Ho (TW); Yi-Ting Lin, Yonghe (TW)

(73) Assignee: Institute for Information Industry, Taipei (TW)

( * ) Notice: Subject to any disclaimer, the term of this patent is extended or adjusted under 35 U.S.C. 154(b) by 365 days.

(21) Appl. No.: 12/549,998

(22) Filed: Aug. 28, 2009

(65) Prior Publication Data

US 2010/0291864 A1 Nov. 18, 2010

(30) Foreign Application Priority Data

May 18, 2009 (TW) .............................. 98116366 A

(51) Int. Cl.
*H04B 7/14* (2006.01)
(52) U.S. Cl. ........ 455/7; 455/13.4; 455/522; 455/115.1; 455/115.3; 370/318; 370/332; 370/334

(58) Field of Classification Search ........... 455/7, 456.1, 455/42, 130, 114.1, 114.2, 114.3, 67.11, 455/115.1, 115.2, 126, 522, 69, 418, 423, 455/9, 11.1, 13.1, 13.4, 16, 41.2, 513, 67.16, 455/562.1, 571, 115.3, 135, 138, 226.2; 375/260, 375/224; 370/206, 321, 337, 325, 341, 342, 370/335, 329
See application file for complete search history.

(56) References Cited

U.S. PATENT DOCUMENTS

| 7,180,873 | B1 * | 2/2007 | Monte et al. .................. 370/325 |
| 7,356,343 | B2 * | 4/2008 | Feher .......................... 455/456.1 |
| 7,831,220 | B2 * | 11/2010 | Hammerschmidt et al. .......................... 455/114.1 |
| 2007/0025433 | A1 * | 2/2007 | Hammerschmidt et al. .. 375/224 |
| 2010/0046479 | A1 * | 2/2010 | Sampath et al. ............. 370/335 |
| 2011/0077044 | A1 * | 3/2011 | Sampath et al. ............. 455/522 |

* cited by examiner

*Primary Examiner* — Tan Trinh
(74) *Attorney, Agent, or Firm* — Patterson Thuente Christensen Pedersen, P.A.

(57) ABSTRACT

A gain adjustment apparatus, a gain adjustment method, and a tangible machine-readable medium thereof for a multiple input multiple output (MIMO) wireless communication system are provided. The MIMO wireless communication system comprises source antennas, destination antennas, relay stations (RSs) and a relay transmission power limit value. The gain adjustment method comprises the following steps: adjusting the gain of one single RS according to a gain calculation; multiplying the gains of other relay stations by a scaling value for adjustment. According to aforesaid method, the present invention can increase the system capacity of the MIMO wireless communication system.

23 Claims, 4 Drawing Sheets

GAIN ADJUSTMENT APPARATUS, METHOD, AND TANGIBLE MACHINE-READABLE MEDIUM THEREOF FOR A MULTIPLE INPUT MULTIPLE OUTPUT WIRELESS COMMUNICATION SYSTEM

This application claims the benefit from the priority to Taiwan Patent Application No. 098116366 filed on May 18, 2009, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a gain adjustment apparatus, a gain adjustment method, and a tangible machine-readable medium thereof for a multiple input multiple output (MIMO) wireless communication system. More particularly, the present invention relates to a gain adjustment apparatus, a gain adjustment method, and a tangible machine-readable medium thereof that are capable of adjusting a relay station (RS) gain of an MIMO wireless communication system.

2. Descriptions of the Related Art

During the development of mobile communication systems from the third generation (3G) towards post-3G or even 4G, limited frequency spectrum resources have become a major impediment to develop wireless technologies. To enhance the data rate and utilize the frequency spectrum more efficiently, some technologies and approaches have been used to improve the efficiency of spectrum usage, for example, the optimized modulation scheme, the code division multiplexing system or the multiple input multiple output (MIMO) technology. Over recent years, MIMO technology has been widely adopted in the industry; such as the newly emerging Worldwide Interoperability for Microwave Access (WiMAX) standard and the new generation of Wireless LAN (WLAN) have both incorporated the MIMO technology therein.

MIMO refers to signals transmitted and received through multiple antennas synchronously. An MIMO wireless communication system is provided with a plurality of antennas both at the source end and the receiving end, so that data is transmitted through a plurality of signal transmission channels, thereby enhancing the data rate. More specifically, signals are divided into multiple streams at the source end, which are then transmitted synchronously through a plurality of antennas. Since the signals are transmitted through different signal transmission channels, they may have different arriving times at the receiving end. To prevent signals from failing to be combined due to different arriving times, the receiving end utilizes a plurality of antennas simultaneously to receive these signals, and then combines the separate signals by digital signal processing with recalculation to quickly and properly recover the original signal.

Because the signal has been divided before being transmitted, the throughput in a single signal transmission channel is decreased, and the transmission distance of the signal can therefore be enlarged. Accordingly, the MIMO technology can not only increase the transmission speed of signals without requiring any additional spectrum, but also can enlarge the signal transmission distance. Therefore, many wireless network apparatuses that emphasize signal transmission speed and transmission distance now have adopted MIMO technology. Undoubtedly, MIMO technology represents an important breakthrough in the wireless mobile communication field, and has also become a core technology for new generations of mobile communication systems.

On the other hand, although the WiMAX standard already provides a wider bandwidth, lower deployment costs, better quality of service (QoS) and expandability, there are still limitations of network coverage range and signal quality provided. Hence, the work group of IEEE 802.16 standards has further formulated the multi-hop relay standard (MMR-RS), which enlarges the network coverage range of the WiMAX standard by relay stations (RSs).

More specifically, for an MIMO wireless communication system with RSs, each of the RSs firstly receives signals from all source antennas and then processes them to increase the signal strength. Afterwards, the RS transmits the processed signals to the receiving antennas.

Depending on the different processing approaches, the signal processing schemes of the RSs are mainly categorized into the decode-and-forward framework and the amplify-and-forward framework. For RSs adopting the decode-and-forward framework, they perform regenerative processing on signals received from the source antennas, filter noises out of the signals through decoding, and then transmit the signals with noises having been filtered to the receiving antennas. On the other hand, for RSs adopting the amplify-and-forward framework, they perform non-regenerative processing on signals received from the source antennas, i.e., the RSs multiply the signals received from the source antennas with an amplifying gain directly without decoding and noise filtering, and then transmit the multiplied signals to the receiving antennas.

For RSs adopting the decode-and-forward framework, a lot of technologies for improving signal transmission quality have been proposed in the prior art, for example, space-time coding or beam-forming, which attempt to improve the signal transmission quality of RSs adopting the decode-and-forward framework. However, these technologies for improving the signal transmission quality of RSs adopting the decode-and-forward framework are inapplicable to RSs adopting the amplify-and-forward framework. Additionally, besides the problem of improving signal transmission quality, there is also no solution to solve the problem of improving the system capacity of MIMO wireless communication systems using RSs that adopt the amplify-and-forward framework.

In view of this, as the demands of system capacity of MIMO wireless communication systems are increased, it is highly desirable for wireless communication apparatus manufacturers to improve both the system capacity and signal transmission quality of MIMO wireless communication systems using RSs that adopt the amplify-and-forward framework.

SUMMARY OF THE INVENTION

One objective of the present invention is to provide a gain adjustment apparatus for an MIMO wireless communication system. The MIMO wireless communication system comprises a plurality of source antennas, a plurality of destination antennas, a first relay station (RS) and a relay transmission power limit value. The first RS has a first gain value.

The gain adjustment apparatus comprises at least one antenna, a processing module, a calculation module, a gain generating module and an adjustment module. The at least one antenna is configured to receive a plurality of first channel data and a plurality of second channel data. The plurality of the first channel data are related to connection situations of a plurality of channels between the source antennas and the first RS, and the plurality of the second channel data are related to connection situations of a plurality of channels between the first RS and the destination antennas. The processing module is configured to select a first predetermined value according to the relay transmission power limit value, the plurality of first channel data and the plurality of second channel data, and to replace the first gain value of the first RS with the first predetermined value. The calculation module is configured to calculate a first system capacity of the MIMO wireless communication system according to the plurality of the first channel data, the plurality of the second channel data and the first predetermined value. The gain generating module is configured to set a second gain value according to the first system capacity. The adjustment module is configured to replace the first gain value of the first RS with the second gain value. The processing module, the calculation module, the gain generating module and the adjustment module may be implemented as a chip.

Another objective of the present invention is to provide a gain adjustment method for the aforesaid MIMO wireless communication system, comprising the following steps: (a) receiving a plurality of first channel data and a plurality of second channel data, wherein the plurality of the first channel data are related to connection situations of a plurality of channels between the source antennas and the first RS, and the plurality of second channel data are related to connection situations of a plurality of channels between the first RS and the destination antennas; (b) selecting a first predetermined value according to the relay transmission power limit value, the plurality of the first channel data and the plurality of the second channel data; (c) replacing the first gain value of the first RS with the first predetermined value; (d) calculating the first system capacity of the MIMO wireless communication system according to the plurality of the first channel data, the plurality of the second channel data and the first predetermined value; (e) setting a second gain value according to the first system capacity; and (f) replacing the first gain value of the first RS with the second gain value.

Additionally, to achieve the aforesaid objectives, the present invention further provides a tangible machine-readable medium storing a program of a gain adjustment method for an MIMO wireless communication system. When the program is loaded via a computer into the gain adjustment apparatus, the program can execute the aforesaid gain adjustment method.

In summary, the gain adjustment apparatus, the gain adjustment method and the tangible machine-readable medium thereof of the present invention can make a real-time adjustment on the RS gain to increase the gain of each RS in the MIMO wireless communication system, thereby enlarging the system capacity and improving signal transmission quality of the MIMO wireless communication system.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. The present invention provides a gain adjustment apparatus, a gain adjustment method, and a tangible machine-readable medium thereof that can adjust the gain values of the RSs of the MIMO wireless communication system, thereby to increase the system capacity of the MIMO wireless communication system. It should be appreciated that in the following embodiments and the attached drawings, elements unrelated to this invention are omitted from depiction; and the dimensional relationships among the individual elements in the attached drawings are illustrated only for ease of understanding, but not to limit the actual scale.

Figure 1A:
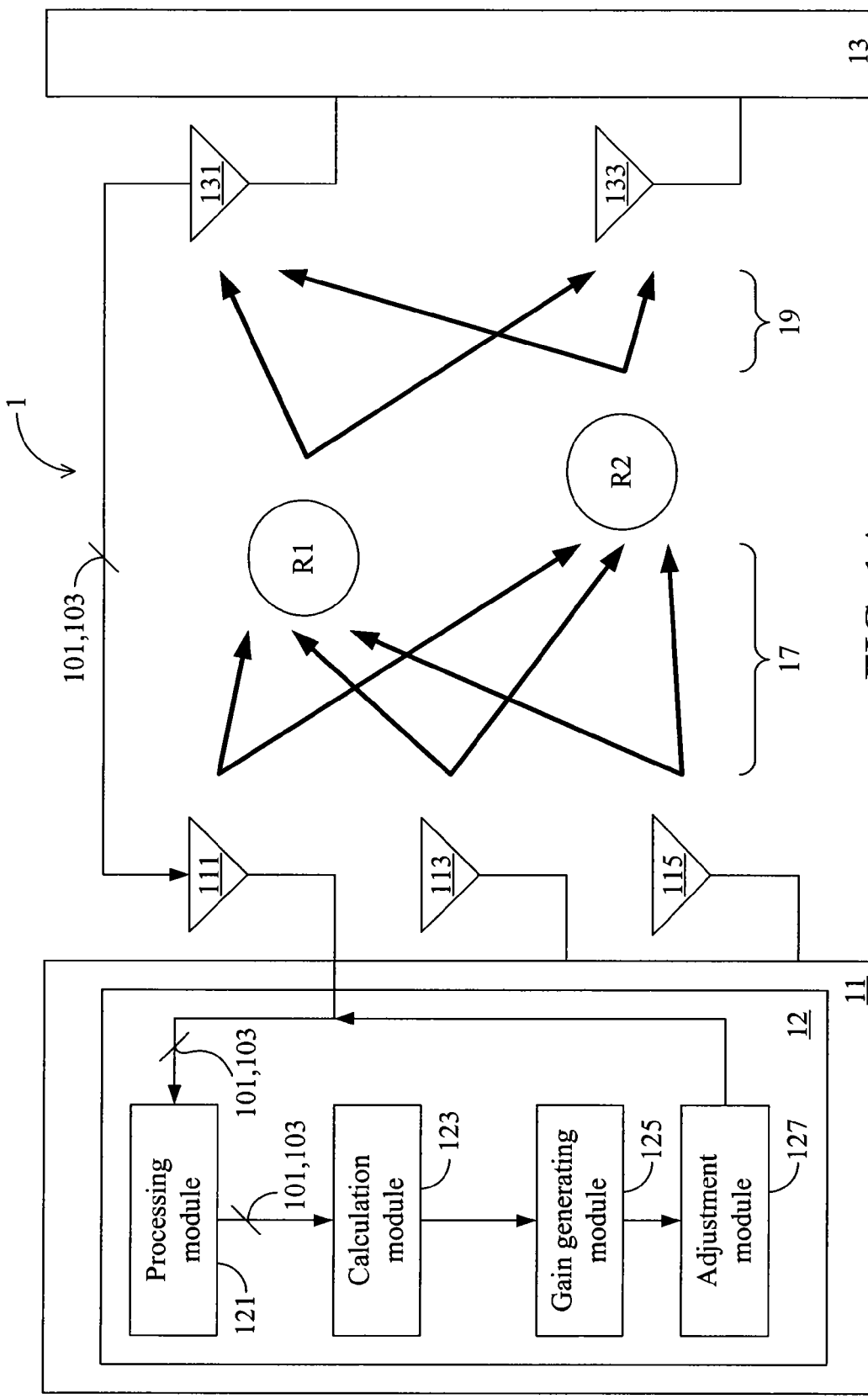
FIG. 1A is a schematic diagrams illustrating a first embodiment of the present invention.

As shown in FIG. 1A, a first embodiment of the present invention is an MIMO wireless communication system 1 having a source station 11, a plurality of relay stations (RSs) R1, R2 and a destination station 13. The RSs R1, R2 are a first RS R1 and a second RS R2 respectively. The source station 11 has three source antennas 111, 113, 115 and a gain adjustment apparatus 12. The first RS R1 and the second RS R2 belong to the same relay layer and each of which has a single antenna (not shown). The destination station 13 has two destination antennas 131, 133.

In other embodiments, each of the first RS R1 and the second RS R2 may have a plurality of antennas. If the first RS R1 has a plurality of antennas, the gain adjustment apparatus 12 designates one of the antennas of the first RS R1 as an antenna for receiving signals. On the other hand, if the second RS R2 has a plurality of antennas, the gain adjustment apparatus 12 designates one of the antennas of the second RS R2 as an antenna for receiving signals. It should be noted that the numbers of the RSs, the source station 11 and the destination station 13 are only for purposes of illustration but not to limit the present invention. In other words, upon reviewing the following descriptions, those of ordinary skill in the art may rapidly apply the present invention to other MIMO wireless communication systems having a different number of RSs (e.g., one first RS and two second RSs) or a different combination of antenna numbers (e.g., a source station having five source antennas and a destination having five destination antennas).

The gain adjustment apparatus 12 comprises an antenna, a processing module 121, a calculation module 123, a gain generating module 125 and an adjustment module 127. In this embodiment, the gain adjustment apparatus 12 is disposed in the source station 11, and the antenna of the gain adjustment apparatus 12 may be one of the source antennas 111, 113, 115, e.g. the source antenna 111. It should be noted that the processing module 121, the calculation module 123, the gain generating module 125 and the adjustment module 127 may be implemented as a chip. In other words, the physical form of the gain adjustment apparatus 12 is not limited in the present invention.

Figure 1B:
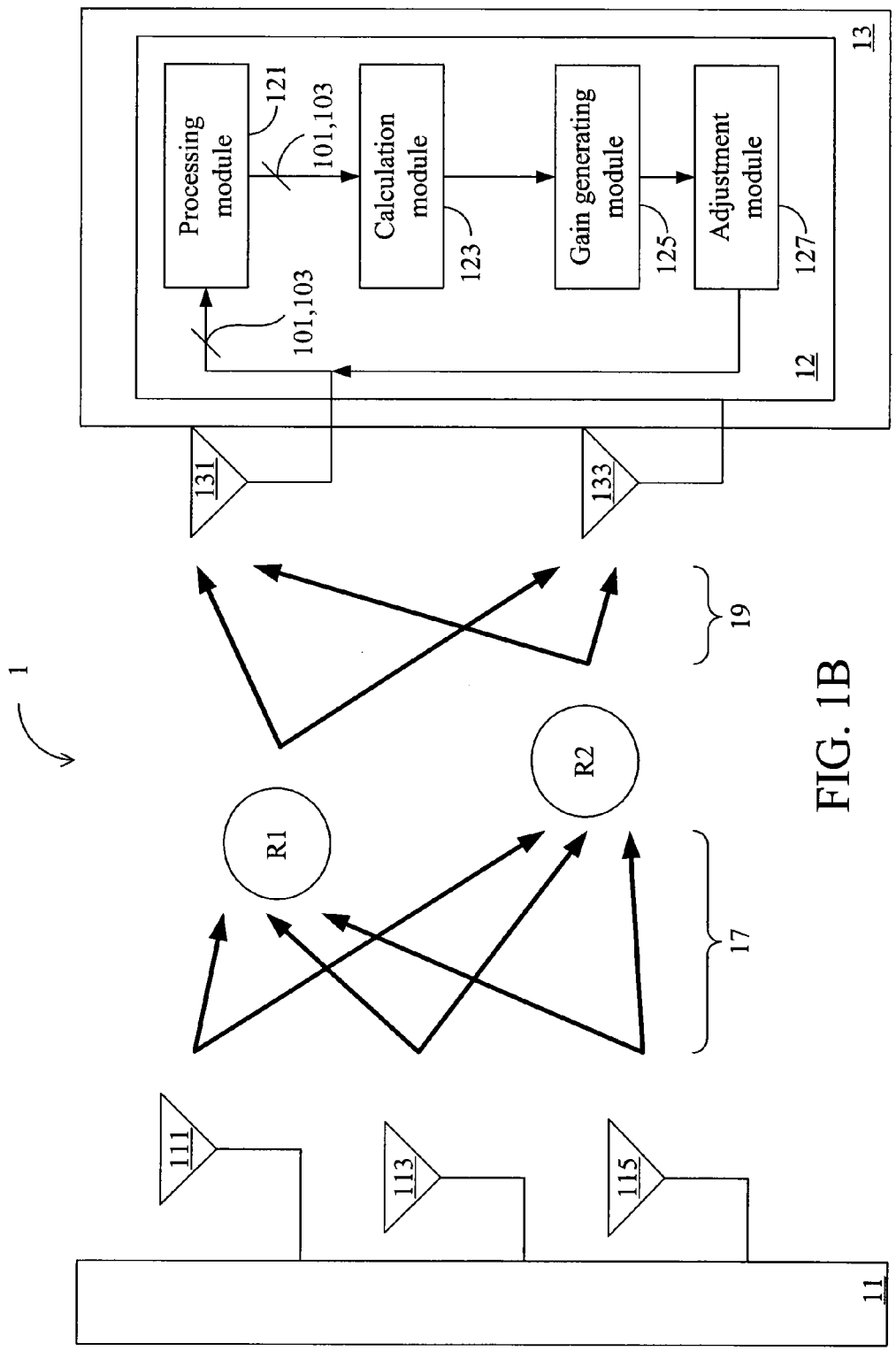
FIG. 1B is a schematic diagrams illustrating an example of the first embodiment.

Apart from being disposed in the source station 11, the gain adjustment apparatus 12 may alternatively be disposed in the destination station 13 as shown in FIG. 1B, in which case the antenna of the gain adjustment apparatus 12 may be one of the destination antennas 131, 133, e.g. the destination antenna 131. It should be noted that the antenna of the gain adjustment apparatus 12 is not limited to one of the source antennas 111, 113 and 115 or one of the destination antennas 131, 133; those of ordinary skill in the art may add antennas to the gain adjustment apparatus 12 depending on practical needs.

In reference to FIG. 1A, both the first RS R1 and the second RS R2 are RSs adopting the amplify-and-forward framework, and the RS subsystem comprising the first RS R1 and the second RS R2 has a relay transmission power limit value.

Furthermore, the first RS R1 has a first gain value. The antennas of the first RS R1 and the second RS R2 establish a plurality of channels 17 with the source antennas 111, 113, 115. The antennas of the first RS R1 and the second RS R2 also establish a plurality of channels 19 with the destination antennas 131, 133. Consequently, signals between the source station 11 and the first and the second RSs R1, R2 can be transmitted through the channels 17, and signals between the first and the second RSs R1, R2 and the destination station 13 can be transmitted through the channels 19. Upon receiving a signal from the source station 11, the first RS R1 multiplies the received signal with the first gain value and then transmits it to the destination station 13. Likewise, upon receiving a signal from the source station 11, the second RS R2 multiplies the received signal with a gain value of the second RS R2 and then transmits it to the destination station 13.

After receiving the signals from the source station 11 via the first RS R1 and the second RS R2, the destination station 13 calculates a plurality of first channel data 101 and a plurality of second channel data 103 according to these signals, and then transmits them to the gain adjustment apparatus 12. The plurality of the first channel data 101 are related to connection situations of the channels 17, and the channels 17 are between the source antennas 111, 113, 115 and the first and the second RSs R1, R2. The plurality of second channel data 103 are related to connection situations of the channels 19, and the channels 19 are between the first and the second RSs R1, R2 and the destination antennas 131, 133. The gain adjustment apparatus 12 may receive the plurality of the first channel dada 101 and the plurality of the second channel data 103 via the antenna (i.e., the source antenna 111) thereof.

In particular, the plurality of the first channel data 101 substantially comprises a channel matrix of the channels 17 between the source antennas 111, 113, 115 and the first and the second RSs R1, R2, as well as covariances of white noise received by the first and the second RSs R1, R2. The plurality of the second channel data 103 substantially comprises a channel matrix of the channels 19 between the first and the second RSs R1, R2 and the destination antennas 131, 133, as well as a covariance of white noise received by the destination station 13.

It should be noted that in this embodiment, since the antenna of the gain adjustment apparatus 12 is the source antenna 111, the gain adjustment apparatus 12 receives the plurality of the first channel data 101 and the plurality of the second channel data 103 from the destination antenna 131 via the source antenna 111. However, in other embodiments as shown in FIG. 1B, because the gain adjustment apparatus 12 is disposed in the destination station 13, it can retrieve the plurality of the first channel data 101 and the plurality of the second channel data 103 directly from the signals received by the destination antennas 131, 133. It should be noted that those of ordinary skill in the art may acquire the plurality of the first channel data 101 and the plurality of the second channel data 103 directly based on the general knowledge of wireless communication, and the way to acquire channel data is not limited herein; those of ordinary skill in the art may use different ways to acquire the plurality of the first channel data 101 and the plurality of the second channel data 103 depending on practical needs, and this will not be further described herein.

After receiving the plurality of the first channel data 101 and the plurality of the second channel data 103, the gain adjustment apparatus 12 proceeds with the gain adjustment calculations. Generally speaking, the gain adjustment apparatus 12 of the present invention sets a different single RS as a target RS each time, and then adjusts the gain value of the respective target RS by a gain calculations in a recursive manner, thereby to find a gain value that can maximize the system capacity of the MIMO wireless communication system 1. Meanwhile, by multiplying the gain values of non-target RSs in the RS subsystem with a ratio respectively, the gain adjustment apparatus 12 further adjusts the gain values of these non-target RSs to improve the system capacity of the MIMO wireless communication system.

For example, when the gain adjustment apparatus 12 sets the first RS R1 as the target RS, the processing module 121 selects a first predetermined value to replace the first gain value of the first RS R1 according to the plurality of the first channel data 101, the plurality of the second channel data 103 and the relay transmission power limit value of the RS subsystem. More specifically, the processing module 121 selects the first predetermined value according to the following Formulas (1), (2) and (3):

$$p(i) = (\sigma_R^2 + P_S |g_i|^2 / M) \quad (1)$$

$$|\alpha_k|^2 \leq P_R / p(i) \quad (2)$$

$$\alpha_k = |\alpha_k| \exp[j\theta(|\alpha_k|)] \quad (3)$$

where i represents the $i^{th}$ RS, and k represents the $k^{th}$ predetermined value. Taking the first RS R1 (i=1) and the first predetermined value (k=1) as an example, p(1) is a transmission parameter value of the first RS R1, $\sigma_R^2$ is a covariance of white noise received by the first RS R1, $P_S$ is a transmission power value of the source station 11, $g_1$ is the first column vector in the channel matrix of the plurality of the first channel data 101, M is the number of antennas of the destination station 13, $P_R$ is the relay transmission power limit value of the RS subsystem, and $\theta(|\alpha_1|)$ is an angle function which is related to the absolute value $|\alpha_1|$ of the first predetermined value and may be defined by the user. The absolute value $|\alpha_1|$ of the first predetermined value must satisfy the conditions as stipulated by Formula (2). In other words, the processing module 121 will select, a value between 0 and $P_R/p(\mathbf{1})$ as the absolute value $|\alpha_1|$ of the first predetermined value according to Formula (2), and generate the first predetermined value $\alpha_1$ to replace the first gain value of the first RS R1 according to Formula (3).

Next, according to the following formula (4) and the first predetermined value $\alpha_1$ that has been previously selected, the processing module 121 calculates a first ratio $\beta_1$ for adjusting the non-target RS (i.e., the second RS R2):

$$\beta_1 = \sqrt{\frac{P_R - |\alpha_1|^2 p(1)}{p(2)|r(2)|^2}} \quad (4)$$

where r(2) represents a third gain value of the second RS R2, which is substantially the pre-adjustment gain value of the second RS R2. Other parameters have already been described in the previous paragraphs, and thus will not be further described herein. In other embodiments, if there is more than one second RS R2 (i.e., more than one non-target RS), Formula (4) may be rewritten as $$\beta_1 = \sqrt{\frac{P_R - |\alpha_1|^2 p(1)}{\sum_j p(j)|r(j)|^2}},$$

where j represents the $j^{th}$ of the non-target RS.

After having calculated the first ratio $\beta_1$, the processing module 121 replaces the third gain value of the second RS R2 with a product of multiplying the third gain value with the first ratio $\beta_1$, and then transmits the plurality of the first channel data 101, the plurality of the second channel data 103, the first predetermined value $\alpha_1$ and the replaced third gain value (i.e., $\beta_1 \times r(2)$) to the calculation module 123. Then, the calculation module 123 calculates a first system capacity of the MIMO wireless communication system 1 according to the plurality of the first channel data 101, the plurality of the second channel data 103, the first predetermined value $\alpha_1$ and the replaced third gain value (i.e., $\beta_1 \times r(2)$).

After the calculation module 123 has calculated the first system capacity of the MIMO wireless communication system 1, similarly, the processing module 121 selects a second predetermined value $\alpha_2$ for replacing the first gain value of the first RS R1 according to Formula (1), Formula (2) and Formula (3), and replaces the first gain value of the first RS R1 with the second predetermined value $\alpha_2$. Here, according to Formula (2), the first predetermined value $\alpha_1$ and the second predetermined value $\alpha_2$ both range between 0 and $P_R/p(1)$ but are substantially different from each other.

Subsequently, according to the following formula (5) and the second predetermined value $\alpha_2$, the processing module 121 calculates a second ratio $\beta_2$ for adjusting the non-target RS (i.e., the second RS R2):

$$\beta_2 = \sqrt{\frac{P_R - |\alpha_2|^2 p(1)}{p(2)|r(2)|^2}} \quad (5)$$

wherein the parameters in Formula (5) have already been described in the previous paragraphs and thus will not be further described herein.

After having calculated the second ratio $\beta_2$, the processing module 121 replaces the third gain value of the second RS R2 with a product of multiplying the third gain value with the second ratio $\beta_2$, and then transmits the plurality of the first channel data 101, the plurality of the second channel data 103, the second predetermined value $\alpha_2$ and the replaced third gain value (i.e., $\beta_2 \times r(2)$) to the calculation module 123. Then, the calculation module 123 calculates a second system capacity of the MIMO wireless communication system 1 according to the plurality of the first channel data 101, the plurality of the second channel data 103, the second predetermined value $\alpha_2$ and the replaced third gain value (i.e., $\beta_2 \times r(2)$).

It should be noted that those of ordinary skill in the art may calculate the first or the second system capacity of the MIMO wireless communication system 1 based on general knowledge of wireless communication, and the present invention has no limitation on how the first or the second system capacity of the MIMO wireless communication system 1 is calculated. Instead, those of ordinary skill in the art may use different ways to calculate the first or the second system capacity of the MIMO wireless communication system 1 depending on practical needs, and this will not be further described herein.

It should also be noted that those skilled in the art may continue to select a third predetermined value, a fourth predetermined value and etc for replacing the first gain value, and calculate a third and a fourth ratios as well as a third and a fourth system capacities correspondingly according to the aforesaid steps and methods. The more predetermined values are selected, the more accurate the gain adjustment results.

After calculating the first and the second system capacity of the MIMO wireless communication system 1, the calculation module 123 transmits the first and the second system capacity of the MIMO wireless communication system 1 to the gain generating module 125 for system capacity comparison.

More specifically, the gain generating module 125 will compare the value of the first system capacity with that of the second system capacity. For example, if the first system capacity is 9 bits while the second system capacity is 8.5 bits, the gain generating module 125 will determine that the first system capacity is larger than the second system capacity. Accordingly, the gain generating module 125 sets the first predetermined value $\alpha_1$ corresponding to the first system capacity as a second gain value and sets the product of multiplying the third gain value with the first ratio $\beta_1$ (i.e., $\beta_1 \times r(2)$) as a fourth gain value.

On the contrary, if the second system capacity is larger than the first system capacity, the gain generating module 125 sets the second predetermined value $\alpha_2$ corresponding to the second system capacity as a second gain value and sets the product of multiplying the third gain value with the second ratio $\beta_2$ (i.e., $\beta_2 \times r(2)$) as a fourth gain value.

Afterwards, the gain generating module 125 transmits the second and the fourth gain values to the adjustment module 127, which then replaces the first gain value of the first RS R1 with the second gain value and replaces the third gain value of the second RS R2 with the fourth gain value. Thus, gain adjustment of the first RS R1 by the gain adjustment module 12 is completed.

Then, the gain adjustment apparatus 12 sets the second RS R2 as the target RS, in which case the first RS R1 becomes a non-target RS correspondingly. In other words, by considering the second RS R2 as the target RS and the first RS R1 as the non-target RS, the gain adjustment apparatus 12 proceeds the aforesaid calculations to further find other preferred gain value combinations.

After the gain value of the second RS R2 has also been adjusted according to the aforesaid procedure, the gain adjustment apparatus 12 may again set the first RS R1 as the target RS to perform a second gain adjustment. In other words, according to the desired number of adjustments, the gain adjustment apparatus 12 alternately sets the first RS R1 and the second RS R2 as the target RS to find the optimal gain value combination. For example, when the number of adjustments is set to be 5, the gain adjustment apparatus 12 will sequentially set the first RS R1, the second RS R2, the first RS R1, the second RS R2 and the first RS R1 as the target RS for gain adjustment. However, as the number of adjustments increases, the computations required by the gain adjustment apparatus 12 also increases. Hence, the number of adjustments may be determined by those of ordinary skill in the art depending on the calculation load of the gain adjustment apparatus 12 and other limitations.

If the gain value adjustment of the MIMO wireless communication system 1 results in the first gain value being replaced by the second gain value and the third gain value being replaced by the fourth gain value, then the adjustment module 127 broadcasts a gain adjustment notification to the first RS R1 and the second RS R2 via antennas of the gain adjustment apparatus 12 (e.g., the source antenna 111). The gain adjustment notification, which meets a notification protocol standard, substantially comprises a message of replacing the first gain value of the first RS R1 with the second gain value and replacing the third gain value of the second RS R2 with the fourth gain value. In another embodiment as shown in FIG. 1B, the gain adjustment apparatus 12 is disposed in the destination station 13 so that the adjustment module 127 of the gain adjustment apparatus 12 can broadcast the gain adjustment notification to the first RS R1 and the second RS R2 via the antennas thereof (e.g., the destination antennas 131, 133).

In response to the gain adjustment notification they receive, the first RS R1 replaces the first gain value with the second gain value and the second RS R2 replaces the third gain value with the fourth gain value respectively. After the first gain value of the first RS R1 and the third gain value of the second RS R2 are replaced by the second gain value and the fourth gain value respectively, the first RS R1 will have a first relay transmission power value and the second RS R2 will have a second relay transmission power value. Because the second and the fourth gain values are obtained from Formulas (1), (2), (3) and Formula (4) or (5), a summation of the first relay transmission power value (i.e., $|\alpha_1|^2 \times p(1)$ or $|\alpha_2|^2 \times p(1)$) and the second relay transmission power value (i.e., $\beta_1^2 \times |r(2)|^2 \times p(2)$ or $\beta_2^2 \times |r(2)|^2 \times p(2)$)) is less than the previously described relay transmission power limit value (i.e., $P_R$)

Figure 1C:
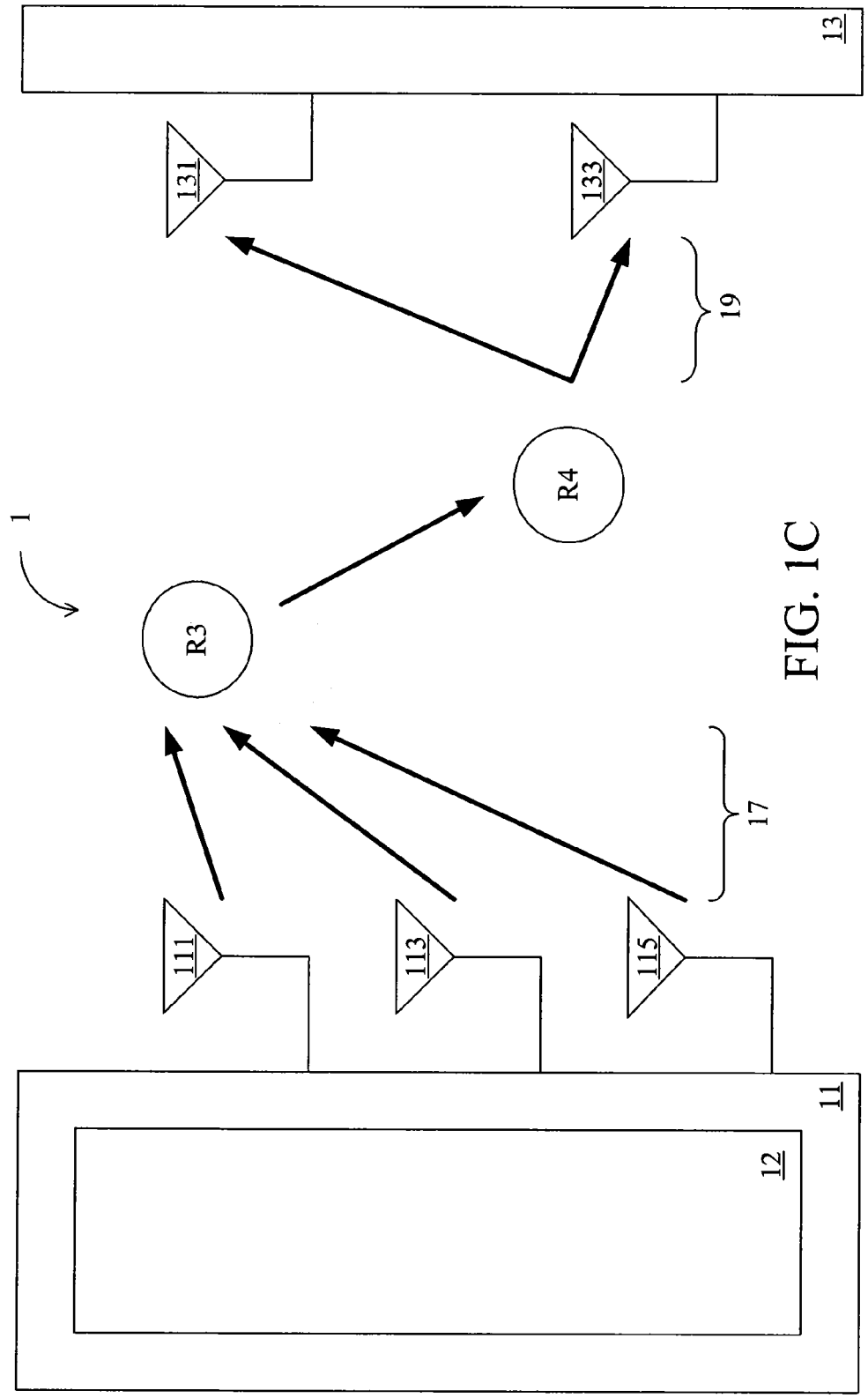
FIG. 1C is a schematic diagrams illustrating another example of the first embodiment.

In this embodiment, the first RS R1 and the second RS R2 belongs to the same relay layer. Alternatively, if the first RS R1 and the second RS R2 belong to different relay layers as shown in FIG. 1C, the gain adjustment apparatus 12 still has to consider channel conditions between the first RS R1 and the second RS R2 to make the aforesaid adjustment. Those of ordinary skill in the art may calculate gain values of the first RS R1 and the second RS R2 based on the previous descriptions, thus this will not be further described herein.

Figure 2:
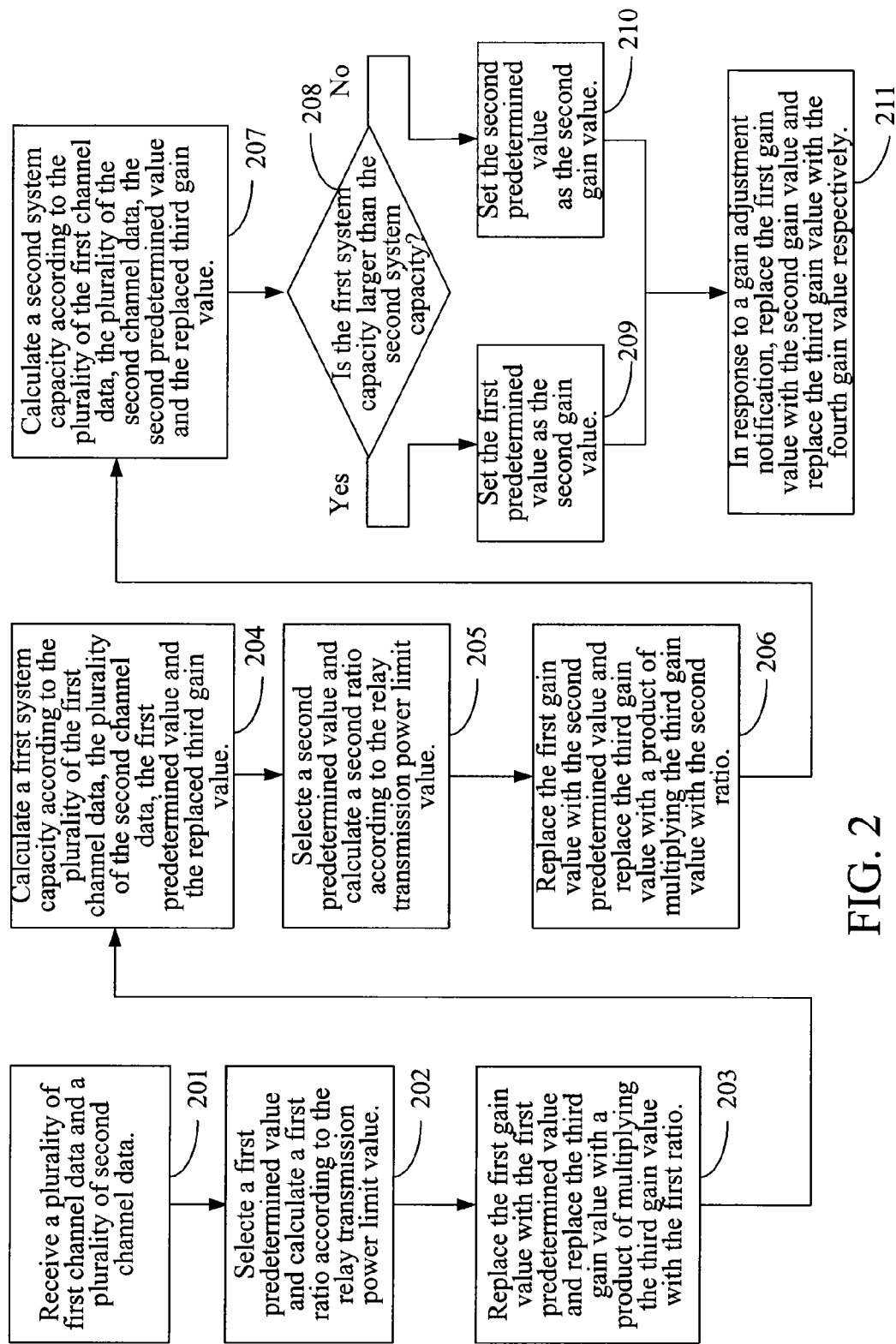
FIG. 2 is a flowchart of a second embodiment of the present invention.

As shown in FIG. 2, a second embodiment of the present invention is a gain adjustment method for an MIMO wireless communication system, for example, the MIMO wireless communication system 1 of the first embodiment. The gain adjustment method of the present invention is for use in a gain adjustment apparatus, for example, the gain adjustment apparatus 12 of the first embodiment. The MIMO wireless communication system 1 comprises a plurality of source antennas 111, 113, 115, a plurality of destination antennas 131, 133, a first RS R1, a second RS R2 and a relay transmission power limit value. The first RS has a first gain value, and the second RS has a third gain value.

In particular, the gain adjustment method of the second embodiment may be implemented by a computer program product which is stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art. When the computer program product is loaded via a computer into the gain adjustment apparatus 12 and a plurality of codes contained therein are executed, the gain adjustment method of the second embodiment can be accomplished.

The gain adjustment method of the second embodiment comprises the following steps. Initially, a plurality of first channel data and a plurality of second channel data are received via at least one antenna step 201. The plurality of the first channel data are related to connection situations of a plurality of channels between the source antennas and the first and the second RSs, and the plurality of the second channel data are related to connection situations of a plurality of channels between the first and the second RSs and the destination antennas. Next, in step 202, a first predetermined value is selected and a first ratio is calculated according to the relay transmission power limit value. Then, the first gain value of the first RS is replaced with the first predetermined value, and the third gain value of the second RS is replaced with a product of multiplying the third gain value with the first ratio via step 203. In particular, the first predetermined value in step 202 may be selected and the first ratio in step 203 be calculated according to Formula (1), (2), (3) and (4) described in the first embodiment, the details of which has already been described in the first embodiment and thus will not be further described herein.

Thereafter, in step 204, a first system capacity of the MIMO wireless communication system is calculated according to the plurality of the first channel data, the plurality of the second channel data, the first predetermined value and the replaced third gain value obtained in step 203. Similarly, a second predetermined value is selected and a second ratio is calculated according to the relay transmission power limit value via step 205. Then, the first gain value of the first RS is replaced with the second predetermined value, and the third gain value of the second RS is replaced with a product of multiplying the third gain value with the second ratio in step 206. In particular, in step 205, the second predetermined value may be selected and the second ratio in step 206 be calculated according to Formulas (1), (2), (3) and (5) described in the first embodiment, the details of which has already been described in the first embodiment and thus will not be further described herein.

Thereafter, in step 207, a second system capacity of the MIMO wireless communication system is calculated according to the plurality of the first channel data, the plurality of the second channel data, the second predetermined value and the replaced third gain value obtained in step 206. Then, the value of the first system capacity is compared with that of the second system capacity via step 208. If the first system capacity is larger than the second system capacity, the first predetermined value is set as a second gain value and a product of multiplying the third gain value with the first ratio is set as a fourth gain value in step 209. Otherwise, if the first system capacity is not larger than the second system capacity as determined in step 208, the second predetermined value is set as the second gain value and a product of multiplying the third gain value with the second ratio is set as the fourth gain value in step 210.

Finally, a gain adjustment notification is transmitted to the first and the second RSs in step 211. In response to the gain adjustment notification, the first RS replaces the first gain value with the second gain value and the second RS replaces the third gain value with the fourth gain value respectively.

In addition to the aforesaid steps, the second embodiment can also execute all the operations and functions set forth in the first embodiment. The method in which the second embodiment executes these operations and functions will be readily appreciated by those of ordinary skill in the art based on the explanation of the first embodiment, and thus will not be further described herein.

According to the above descriptions, the gain adjustment apparatus, the gain adjustment method and the tangible machine-readable medium thereof of the present invention adjust the gain by setting a different single RS as a target RS each time to perform a gain calculation and multiplying gain values of non-target RSs with a ratio respectively, thereby to maximize the system capacity of the MIMO wireless communication system. Additionally, the present invention can further adjust the calculation load flexibly depending on the hardware configuration of the gain adjustment apparatus, environmental resources of RSs and demands of the user. As a result, the system capacity of the MIMO wireless communication system is improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A gain adjustment method for a multiple input multiple output (MIMO) wireless communication system, the MIMO wireless communication system comprising a plurality of source antennas, a plurality of destination antennas, a first relay station (RS) and a relay transmission power limit value, the first RS having a first gain value, the gain adjustment method comprising the steps of:

receiving a plurality of first channel data and a plurality of second channel data, wherein the plurality of the first channel data are related to connection situations of a plurality of channels between the source antennas and the first RS, and the plurality of the second channel data are related to connection situations of a plurality of channels between the first RS and the destination antennas;

selecting a first predetermined value according to the relay transmission power limit value, the plurality of the first channel data and the plurality of the second channel data;

replacing the first gain value of the first RS with the first predetermined value;

calculating a first system capacity of the MIMO wireless communication system according to the plurality of the first channel data, the plurality of the second channel data and the first predetermined value;

setting a second gain value according to the first system capacity; and replacing the first gain value of the first RS with the second gain value.

2. The gain adjustment method of claim 1, wherein the step of setting the second gain value according to the first system capacity further comprises the steps of:

selecting a second predetermined value according to the relay transmission power limit value, the plurality of the first channel data and the plurality of the second channel data;

replacing the first gain value of the first RS with the second predetermined value, wherein the first predetermined value and the second predetermined value are substantially different;

calculating a second system capacity of the MIMO wireless communication system according to the plurality of the first channel data, the plurality of the second channel data and the second predetermined value; and comparing the second system capacity and the first system capacity.

3. The gain adjustment method of claim 2, wherein the second gain value is substantially the first predetermined value when the first system capacity is larger than the second system capacity.

4. The gain adjustment method of claim 2, wherein the second gain value is substantially the second predetermined value when the second system capacity is larger than the first system capacity.

5. The gain adjustment method of claim 1, the MIMO wireless communication system further comprising at least one second RS having a third gain value, the gain adjustment method further comprising the steps of:

multiplying the third gain value by a ratio value to generate a fourth gain value; and replacing the third gain value of the at least one second RS with the fourth gain value.

6. The gain adjustment method of claim 5, further comprising the steps of:

transmitting a gain adjustment notification to the first RS and the at least one second RS, wherein the gain adjustment notification meets a notification protocol standard;

wherein the first gain value of the first RS is replaced with the second gain value according to the gain adjustment notification; and wherein the third gain value of the at least one second RS is replaced with the fourth gain value according to the gain adjustment notification.

7. The gain adjustment method of claim 5, wherein after the first gain value of the first RS and the third gain value of the at lest one second RS are respectively replaced with the second gain value and the fourth gain value, the first RS has a first relay transmission power value, the at least one second RS has at least one second relay transmission power value, and a summation of the first relay transmission power value and the at least one second transmission power value is less than the relay transmission power limit value.

8. A gain adjustment apparatus for an MIMO wireless communication system, the MIMO wireless communication system comprising a plurality of source antennas, a plurality of destination antennas, a first RS and a relay transmission power limit value, the first RS having a first gain value, the gain adjustment apparatus comprising:

at least one antenna being configured to receive a plurality of first channel data and a plurality of second channel data, wherein the plurality of the first channel data are related to connection situations of a plurality of channels between the source antennas and the first RS, and the plurality of the second channel data are related to connection situations of a plurality of channels between the first RS and the destination antennas;

a processing module being configured to select a first predetermined value according to the relay transmission power limit value, the plurality of the first channel data and the plurality of the second channel data, and to replace the first gain value of the first RS with the first predetermined value;

a calculation module being configured to calculate a first system capacity of the MIMO wireless communication system according to the plurality of the first channel data, the plurality of the second channel data and the first predetermined value;

a gain generating module being configured to set a second gain value according to the first system capacity; and an adjustment module being configured to replace the first gain value of the first RS with the second gain value.

9. The gain adjustment apparatus of claim 8, wherein the at least one antenna is substantially one of the source antennas.

10. The gain adjustment apparatus of claim 9, wherein the MIMO wireless communication system further comprises at least one second RS having a third gain value, the gain generating module multiplies the third gain value by a ratio value to generate a fourth gain value, and the adjustment module replaces the third gain value of the at least one second RS with the fourth gain value.

11. The gain adjustment apparatus of claim 10, wherein the at least one antenna transmits a gain adjustment notification to the first RS and the at least one second RS, so that the first RS replaces the first gain value with the second gain value according to the gain adjustment notification, and the at least one second RS replaces the third gain value with the fourth gain value according to the gain adjustment notification, wherein the gain adjustment notification meets a notification protocol standard.

12. The gain adjustment apparatus of claim 10, wherein after the first gain value of the first RS and the third gain value of the at lest one second RS are respectively replaced with the second gain value and the fourth gain value, the first RS has a first relay transmission power value, the at least one second RS has at least one second relay transmission power value, and a summation of the first relay transmission power value and the at least one second transmission power value is less than the relay transmission power limit value.

13. The gain adjustment apparatus of claim 8, wherein the at least one antenna is substantially one of the destination antennas.

14. The gain adjustment apparatus of claim 8, wherein the processing module selects a second predetermined value according to the relay transmission power limit value, the plurality of the first channel data and the plurality of the second channel data, replaces the first gain value of the first RS with the second predetermined value, and the first predetermined value and the second predetermined value are substantially different, the calculation module calculates a second system capacity of the MIMO wireless communication system according to the plurality of the first channel data, the plurality of the second channel data and the second predetermined value, the gain adjustment generating module compares the second system capacity and the first system capacity.

15. The gain adjustment apparatus of claim 14, wherein the gain generating module sets the first predetermined value as the second gain value when the first system capacity is larger than the second system capacity.

16. The gain adjustment apparatus of claim 14, wherein the gain generating module sets the second predetermined value as the second gain value when the second system capacity is larger than the first system capacity.

17. A tangible machine-readable medium storing a program of a gain adjustment method for an MIMO wireless communication system, the MIMO wireless communication system comprising a plurality of source antennas, a plurality of destination antennas, a first RS and a relay transmission power limit value, the first RS having a first gain value, the program comprising:
  a code A for at least one antenna to receive a plurality of first channel data and a plurality of second channel data, wherein the plurality of the first channel data are related to connection situations of a plurality of channels between the source antennas and the first RS, and the plurality of the second channel data are related to connection situations of a plurality of channels between the first RS and the destination antennas;
  a code B for a processing module to select a first predetermined value according to the relay transmission power limit value, the plurality of the first channel data and the plurality of the second channel data;
  a code C for replacing the first gain value of the first RS with the first predetermined value;
  a code D for a calculation module to calculate a first system capacity of the MIMO wireless communication system according to the plurality of the first channel data, the plurality of the second channel data and the first predetermined value;
  a code E for a gain generating module to set a second gain value according to the first system capacity; and
  a code F for an adjustment module to replace the first gain value of the first RS with the second gain value.

18. The tangible machine-readable medium of claim 17, wherein the code E further comprises:
  a code E1 for the processing module to select a second predetermined value according to the relay transmission power limit value, the plurality of the first channel data and the plurality of the second channel data;
  a code E2 for replacing the first gain value of the first RS with the second predetermined value, wherein the first predetermined value and the second predetermined value are substantially different;
  a code E3 for the calculation module to calculate a second system capacity of the MIMO wireless communication system according to the plurality of the first channel data, the plurality of the second channel data and the second predetermined value; and
  a code E4 for the gain generating module to compare the second system capacity and the first system capacity.

19. The tangible machine-readable medium of claim 18, wherein the code E further comprises:
  a code E5 for the gain generating module to set the first predetermined value as the second gain value when the first system capacity is larger than the second system capacity.

20. The tangible machine-readable medium of claim 18, wherein the code E further comprises:
  a code E5 for the gain generating module to set the second predetermined value as the second gain value when the second system capacity is larger than the first system capacity.

21. The tangible machine-readable medium of claim 17, wherein the MIMO wireless communication system further comprising at least one second RS having a third gain value, the program further comprising:
  a code G for the gain generating module to multiply the third gain value by a ratio value to generate a fourth gain value; and
  a code H for the adjustment module to replace the third gain value of the at least one second RS with the fourth gain value.

22. The tangible machine-readable medium of claim 21, further comprising:
  a code I for the at least one antenna to transmit a gain adjustment notification to the first RS and the at least one second RS, wherein the gain adjustment notification meets a notification protocol standard;
  wherein the first gain value of the first RS is replaced with the second gain value according to the gain adjustment notification; and
  wherein the third gain value of the at least one second RS is replaced with the fourth gain value according to the gain adjustment notification.

23. The tangible machine-readable medium of claim 21, wherein after the first gain value of the first RS and the third gain value of the at lest one second RS are respectively replaced with the second gain value and the fourth gain value, the first RS has a first relay transmission power value, the at least one second RS has at least one second relay transmission power value, and a summation of the first relay transmission power value and the at least one second transmission power value is less than the relay transmission power limit value.

* * * * *